United States Patent Office 3,226,158
Patented Dec. 28, 1965

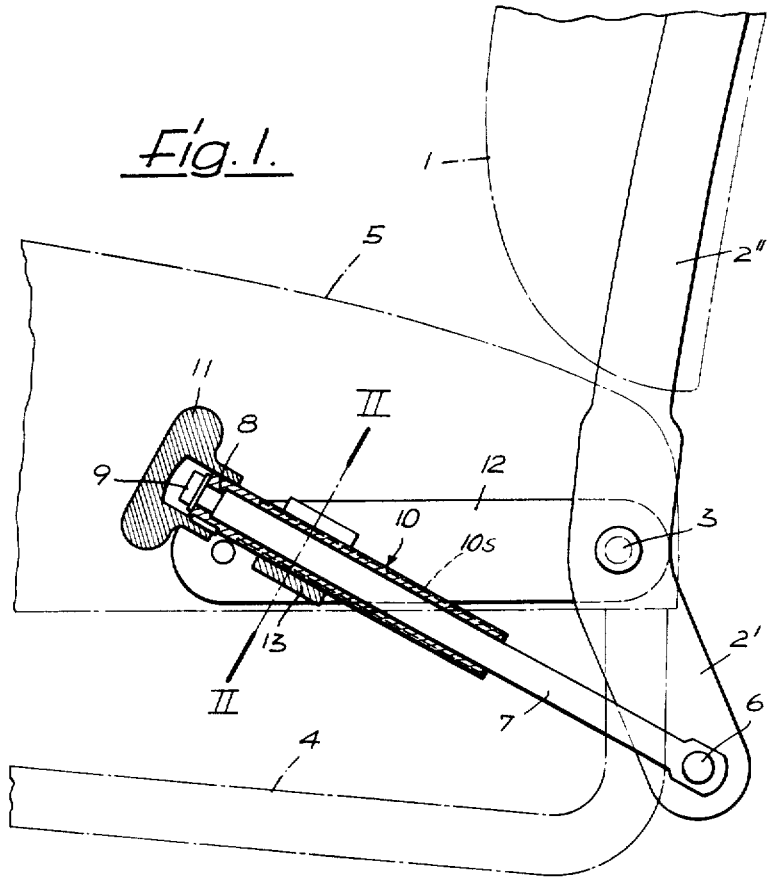
Fig. 1.
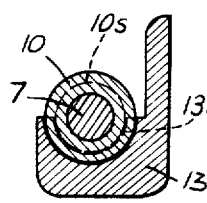
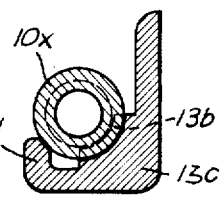
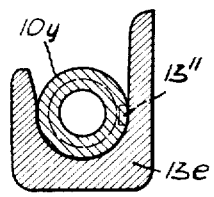
Fig. 2.  Fig. 3.  Fig. 4.

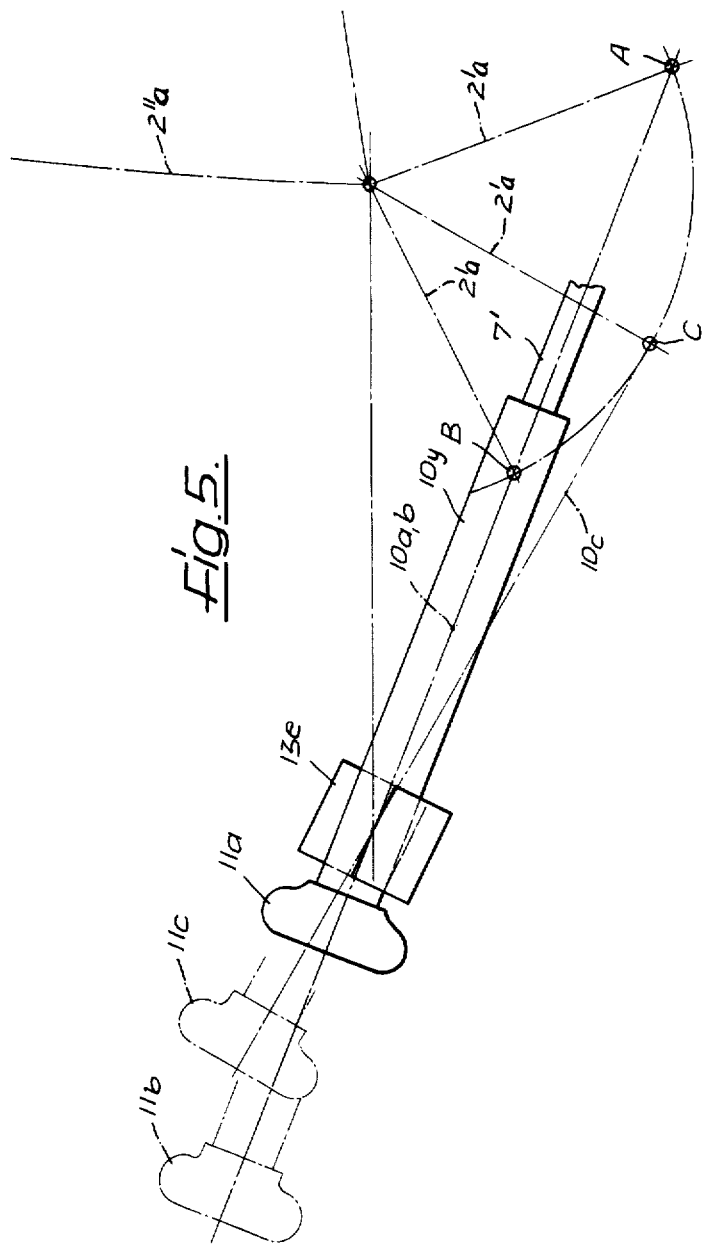

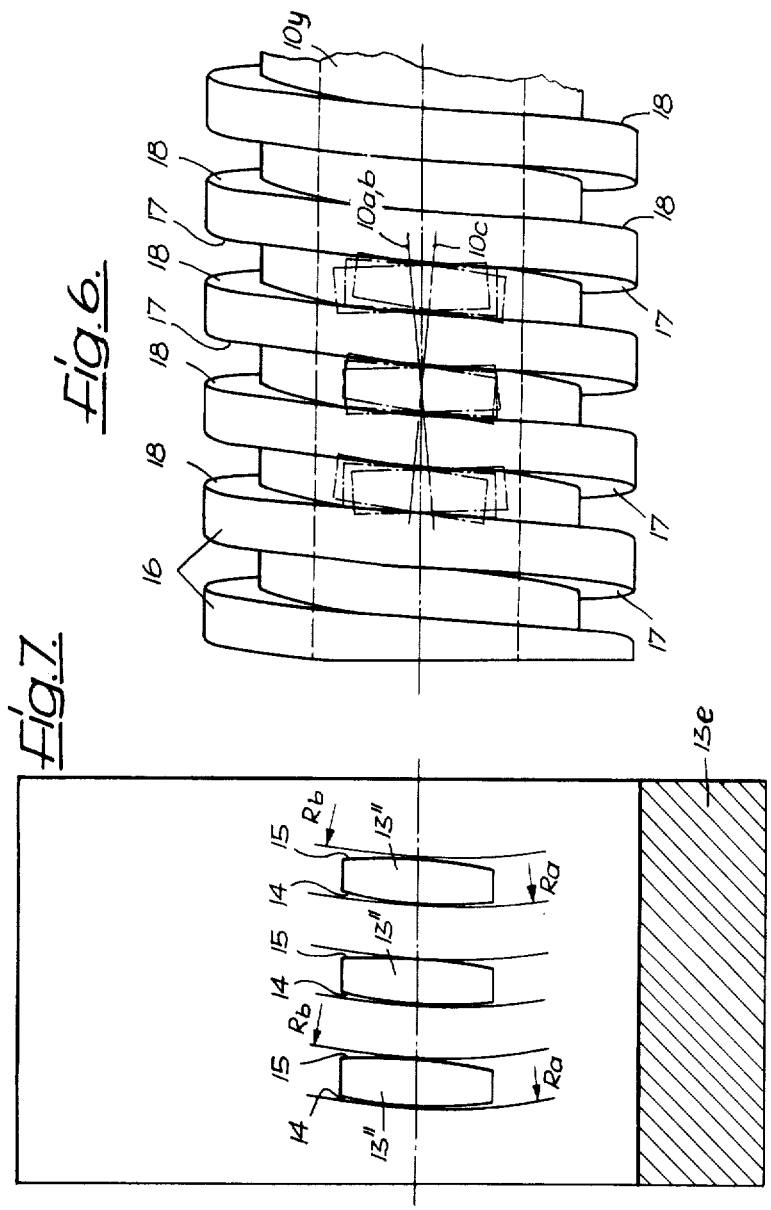

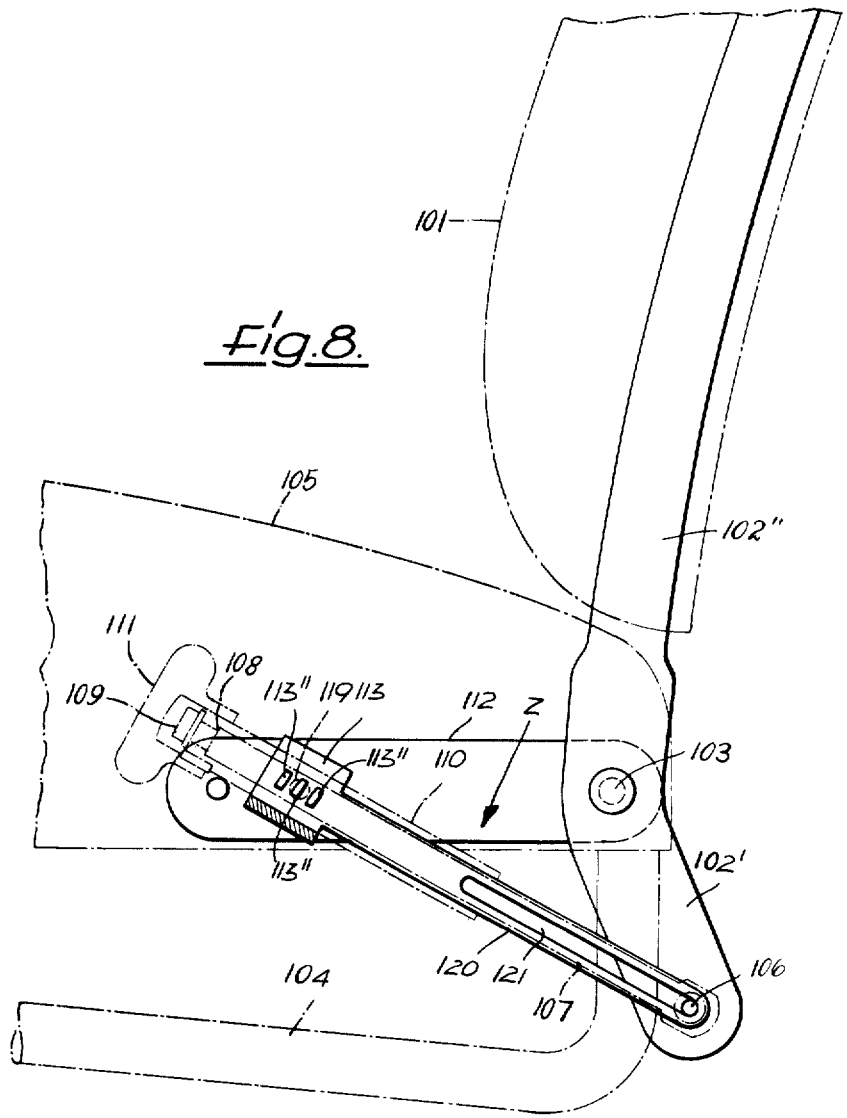

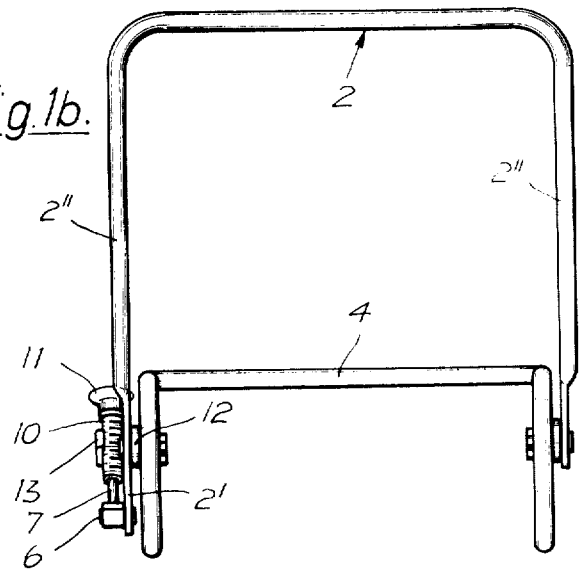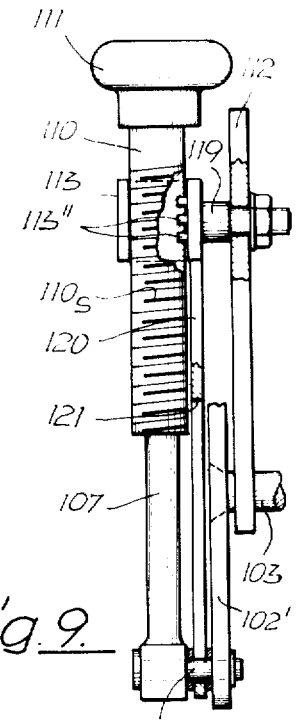

3,226,158
DEVICE FOR ADJUSTING THE BACK REST OF A SEAT
Werner Strien, Stuttgart-Weilimdorf, and Jörg Resag, Stuttgart-Degerloch, Germany, assignors, by mesne assignments, to Recaro A.G., Glarus, Switzerland, a corporation of Switzerland
Filed Sept. 4, 1963, Ser. No. 306,544
Claims priority, application Germany, Sept. 27, 1962, St 19,763
8 Claims. (Cl. 297—361)

The present invention relates to a device for adjusting the angle of inclination of the pivotable back rest of a seat, especially of a motor vehicle, by means of a draw rod which is pivotably connected to the back rest and is adjustable in its axial direction by a pair of interengaging threaded elements which are axially movable relative to each other and one of which is connected to the draw rod so as to be immovable thereon in the axial direction while the other element is connected to a fixed part of the seat frame so as to be immovable thereon in its axial direction.

In the known devices of this type the two threaded elements are formed by a spindle and a nut thereon. Such a device has the disadvantage that for any adjustment of the back rest the spindle has to be turned a number of times in proportion to the extent of the desired adjustment, which means that it may have to be turned a great number of times, if the back rest is to be pivoted for a considerable distance.

It is an object of the present invention to overcome this disadvantage. According to the invention, this object is attained by arranging one of the two threaded elements in the form of a nut segment into which the other threaded element in the form of a spindle may be inserted in a direction transverse to its axis and at different parts of its length, so that different sections of the spindle thread may be quickly engaged with or disengaged from the nut segment. In this manner it is possible to effect a quick coarse adjustment of the back rest by inserting a different part of the spindle into the nut segment and then to effect a fine adjustment by turning the spindle about its axis.

In devices for adjusting the pivotable back rests of seats it is known generally to provide means for disenengaging normally interengaging parts. Thus, for example, in one known device a pawl which may be inserted between the teeth of a toothed segment which is secured to a back rest is mounted on a lever which is pivotably connected to the seat frame and may be adjusted by threaded means to different positions along the length of this lever. In a device of this type, however, the range of its infinite adjustability is very small. In another known device a worm which is rotatably mounted on a lever which is pivotably connected to the back rest may be engaged with or disengaged from a worm-wheel segment which is secured to the seat frame. When the worm and worm-wheel segment are in engagement, the fine adjustment may be carried out by a rotation of the worm. Both of these known devices require a relatively large number of parts and their manufacture is rather expensive.

Over these prior devices, the device according to the invention has the considerable advantages that it is of a very simple and inexpensive construction and that it permits the back rest to be infinitely adjusted within a large range.

For the purpose of quickly inserting the spindle into the nut segment or of disengaging it therefrom, the invention provides that the sector angle of the nut segment may be larger than 90° but not larger than 180°. The insertion is, however, also possible if the sector angle of the nut segment is larger than 0° but not larger than 90° or if the flanks of the thread portions of the nut segment are designed so as to engage only tangentially with the flanks of the turns of the spindle. In each of these last two cases it is then necessary according to the invention to provide at least one abutment for supporting the spindle in each of two adjacent quadrants of the nut segment.

Since the draw rod and thus also the spindle are pivotably connected to the pivotable back rest, the pivot point of the draw rod on the back rest will move along an arc when the back rest is being pivoted. In consideration of this fact, the device according to the invention may be designed so that only a tangential engagement will occur between the flanks of the thread portions of the nut segment and the flanks of the threads of the spindle, as will be more clearly set forth below.

In some cases, for example, when the nut segment is spaced at a short distance from the pivot point of the draw rod and when the pitch diameter is also small, it is advisable that the nut segment be rotatably mounted in such a manner that its axis extends through the pivot point of the draw rod when the spindle and the nut segment are in engagement with each other. This may be accomplished, for example, by mounting the nut segment on a fixed part of the seat frame in a manner, so as to be rotatable about an axis which substantially intersects the axis of the nut segment substantially at a right angle thereto and extends substantially parallel to the pivot axis of the draw rod.

For attaining the objects and advantages of the invention, it is, however, necessary in every case that the spindle is provided with a self-locking screw thread.

The various features and advantages of the present invention will become more clearly apparent from the following detailed description thereof which is to be read with reference to the accompanying largely diagrammatic drawings, in which:

FIGURE 1 shows an elevation, partly in section, of the device according to the invention;

FIG. 1b shows a side view of the device as shown in FIG. 1;

FIG. 2 shows a cross section, taken along line II—II of FIG. 1, of the nut segment and spindle connection;

FIG. 2b shows a view of the threaded spindle of the embodiment as shown in FIGS. 1, 1b and 2;

FIG. 2c shows a perspective view of the nut segment of the embodiment as shown in FIGS. 1, 1b, and 2;

FIG. 3 shows a cross section of a variation of the nut segment and spindle connection of FIGS. 1 and 2;

FIG. 4 shows a cross section of a nut segment and spindle connection of a second embodiment of the invention;

FIG. 5 shows generally a diagram of the different positions of the threaded spindle of the second embodiment;

FIGS. 6 and 7 show, respectively, an enlarged partial view of a spindle and a cross section of a nut segment of the second embodiment of the invention.

FIGURE 8 shows an elevation of a modification of the device as shown in FIGURE 1.

FIG. 9 shows a view, partially in cross section, of a detail from FIG. 8, seen in the direction of the arrow Z shown in FIG. 8.

As illustrated in FIGS. 1, 1b, 2, 2b and 2c, the back rest 1 of the seat has a frame member 2 which forms two two-armed levers each with arms 2', 2''. These levers are pivotably connected to journals 3 on a frame 4 of the seat part 5. The shorter lower arm 2' of one of these levers carries a draw rod 7 which is pivotably connected thereto at the pivot 6 and is on its other end portion provided with a sleeve 10 which has an outer screw thread 10s thereon and thus forms a threaded tubular spindle which is rotatable about the draw rod 7 but is prevented from moving in the axial direction thereof by an inner flange on the end of the tubular spindle or sleeve 10 engaging into a reduced end portion of the draw rod 7 and against shoulder 8 thereof, and by a screw 9 which is screwed into the end of the draw rod 7 and against the end of spindle 10. For turning the tubular spindle 10 about its axis and thus about draw rod 7, a knob 11 is rigidly secured to the end of the spindle 10. The latter engages into a nut segment 13 which is rigidly mounted on a frame member 12 of the seat frame 4, so that by turning the knob 11 on the spindle 10, it is possible to pivot the back rest 1 about its journal 3.

The nut segment 13 may be made of various designs some of which are illustrated in FIGURES 2 to 7, and its sector angle of its thread part may amount up to 180°. In the embodiment, as shown in FIGS. 1, 1b, 2, 2b and 2c, the sector angle of the thread part 13a of the nut segment 13 amounts to 180°. In a variation thereof, as shown in FIG. 3, the sector angle of the thread part 13b of the nut segment 13c amount to only 90°, and in a further variation as shown in FIG. 4, the sector angle of the thread part 13″ of the nut segment 13e amounts to less than 90°. Whenever the sector angle of the nut segment amounts to or is smaller than 90°, it is necessary to support the tubular spindle within a quadrant adjacent to the quadrant containing the thread parts of the nut segment, so as to prevent the spindle from disengaging from the nut segment. This is accomplished in the embodiment according to FIG. 3 by providing the nut segment 13c, having a thread part 13b with a sector angle of 90° with a projection 13′ which forms an abutment on which the spindle 10x engages.

FIGURE 5 illustrates diagrammatically the outer end positions A and B and an intermediate position C of the pivot point of the draw rod 7′ on the arm 2′a of the lever 2a′ and 2a″, the corresponding positions 11a, 11b, and 11c of the knob, and the corresponding positions 10a, 10b, and 10c of the axis of the spindle 10y. In view of the different possible positions of the spindle 10y on the draw rod 7, the nut segment and the spindle engagement is designed so that the flanks 14 and 15 of the thread portions 13 of the nut segment 13c will engage only tangentially with the flanks of the screw thread on the spindle 10y. For this purpose these flanks are designed as follows (FIGS. 5 and 6):

Flanks 15 of the thread portions 13″ of the nut segment 13e are facing toward the pivot point positions A, B and C of the draw rod 7′ and towards flanks 17 of thread portions of the spindle 10y. Flanks 14 of the thread portions 13″ of the nut segment 13e are opposite to the flanks 15 and are facing toward flanks 18 of thread portions of the spindle 10y.

Each flank 15 lies outside of the largest possible circle $R_b$ about the point B along which points lying on the adjacent flank 17 may pass, when the spindle 10y is pivoted about its axis.

Each flank 14 lies at the inside of the smallest possible circle $R_a$ about the point A along which points lying on the adjacent flank 18 may pass, when the spindle 10y is pivoted about its axis;

If these conditions would not be fulfilled, the thread portions 13″ would not be disposed between the flanks 17 and 18 of the screw thread of the spindle 10y, as indicated in dot-and-dash lines in FIGURE 6.

With any embodiment of the invention, the nut segment may generally be rigidly secured to the frame member 12 of the seat. Under certain conditions, however, especially when the ratio between the effective length of draw rod 7 intermediate the pivot point 6 and the nut segment 13 and the length of the lever arm 2′ is small, reliable engagement of the spindle 10y with the nut segment 13 and a self-locking action between them may be attained only, if the nut segment 13 is rotatable in a manner so that when the spindle 10y and the nut segment 13 are in engagement with each other, the axis of the segment 13 will extend through the pivot point 6 of the draw rod 10y and therefore coincide with the respective positions of the axis of the spindle 10y, for example, the position 10a, 10b, or 10c. This may be attained, as illustrated in FIG. 8 which shows a back rest 101 with a frame member which forms a two-armed lever 102′, 102″ pivotally connected to a journal 103 on the frame 104 of the seat part 105. The shorter lower arm 102′ of this lever carries a draw rod 107 which is pivotally connected thereto at 106 and is on its other end portion provided with a sleeve 110 which has an outer screw thread thereon and thus forms a threaded tubular spindle which is rotatable on the draw rod 107, but is prevented from moving in the axial direction thereof by an inner flange on the end of the tubular spindle 110 engaging into a reduced end portion of the draw rod 107 and against a shoulder 108 thereof, and by a screw 109 which is screwed into the end of the draw rod 107 and against the end of the spindle 110. For turning the tubular spindle 110 about its axis and thus about the draw rod 107, a knob 111 is rigidly secured to the end of the spindle 110. The spindle 110 engages into a nut segment 113 which is provided with thread parts 113″ like the thread parts 13″ of FIGS. 4 and 7, and is pivotally mounted on a frame member 112 of the seat frame 104 by means of a bolt 119, the axis of which is the pivot axis of the nut segment 113. The bolt 119 is connected to the frame member 112 so as to intersect the axis of the nut segment 113 substantially at a right angle thereto and to extend substantially parallel to the pivot axis 106 of the draw rod 110. In order to insure that the nut segment 113 will always be located in the proper rotary position in which its axis will be in accurate alignment with the respective position of the pivot point 106, it is advisible to secure the nut segment 113 rigidly to a guide arm 120 which is provided with a longitudinal slot 121 which extends coaxially or parallel to the axis of segment 113 and through which the pivot pin 106 extends transversely and is slidable therein longitudinally.

Although our invention has been illustrated and described with reference to the preferred embodiments thereof, we wish to have it understood that it is in no way limited to the details of such embodiments, but is capable of numerous modifications within the scope of the appended claims.

We claim:
1. A seat especially for a motor vehicle having an adjustable back rest comprising a rigid seat frame, a seat portion supported by said seat frame, a back rest having a rigid back frame, said back frame comprising two levers, pivot means for pivotally connecting said levers to said seat frame, one of said levers having two arms, a draw rod pivotally connected to the free end of one of the arms of said two-armed lever, a pair of interengaging threaded elements having self-locking screw threads, one of said elements forming a tubular spindle surrounding the free part of said draw rod and having screw threads on its surface and being rotatable about the axis of said draw rod but immovable axially relative thereto, and other element being a shell-like member provided with screw threads on its inner surface thus forming a nut segment and being mounted on said seat frame, said two threaded elements being adapted to be engaged with and disengaged from each other so that, when said elements are disengaged said draw rod may be moved substantially in its axial direction free from said nut segment for coarsely adjusting the inclination of said back rest relative to said seat, and when said elements are engaged, said spindle may be turned about its axis in said nut segment in one or the opposite direction for finely adjusting the inclination of said back rest and for locking said back rest in the adjusted position by means of said self-locking screw threads.

2. A seat especially for a motor vehicle having an adjustable back rest comprising a rigid seat frame, a seat portion supported by said seat frame, a back rest having a rigid back frame, said back frame comprising two levers, pivot means for pivotally connecting said levers to said seat frame, one of said levers having two arms, a draw rod pivotally connected to the free end of one of the arms of said two-armed lever, a tubular member having an outer screw thread thereon rotatably mounted on said draw rod but axially immovable relative thereto and therefore adapted to be pivoted together with said draw rod about a pivot point on said free end of said lever arm, said draw rod and said tubular member together forming a unit, and a handle on the free end of said tubular member, a shell-like member open in the upward direction and having a substantially semi-cylindrical inner surface of a sector angle of more than 90° but not more than 180° relative to the axis of said shell-like member, said shell-like member being mounted on said seat frame and adapted to support said tubular member within the area of said screw thread at least at two supporting points, one of said points lying within the area of 0° to 90° and the other point within the area of 91° to 180°, said shell-like member having at least one nut thread element on its inner surface forming at least one of said supporting points and adapted to interengage with said screw thread of said tubular member, said screw thread and said nut thread element when in engagement forming a self-locking screw connection, said unit adapted to be inserted into and disengaged from said shell-like member in a direction substantially transverse to the axes of said unit and said shell-like member by pivoting said unit about its pivot axis on said lever arm, whereby said screw thread is adapted to be engaged with or disengaged from said supporting points, so that when said unit is disengaged from said shell-like member, said unit may be quickly moved substantially in its axial direction relative to and free of said shell-like member for coarsely adjusting the inclination of said back rest, while when said threaded tubular member is in engagement with said shell-like member, said tubular member may be turned about its axis and thereby screwed along said shell-like member for finely adjusting the inclination of said back rest and for locking said back rest in the adjusted position.

3. The seat, as set forth in claim 2, in which when said unit is inserted into said shell-like member, said threaded tubular member is supported by said shell-like member on and in engagement with said thread element, said nut thread element having a sector angle larger than 0° but not larger than 90° relative to the axis of said shell-like member, said tubular member then being further supported on an unthreaded part of said shell-like member disposed within the quadrant adjacent to the quadrant containing said thread element.

4. The seat, as set forth in claim 2, in which said thread element has a sector angle of 180° relative to the axis of said shell-like member.

5. A seat especially for a motor vehicle having an adjustable back rest comprising a rigid seat frame, a seat portion supported by said seat frame, a back rest having rigid back frame, said back frame comprising two levers, pivot means for pivotally connecting said levers to said seat frame, one of said levers having two arms, a draw rod pivotally connected to the free end of one of the arms of said two-armed lever, a tubular member having an outer screw thread thereon rotatably mounted on said draw rod but axially immovable relative thereto and therefore adapted to be pivoted together with said draw rod about a pivot point on said free end of said lever arm, said draw rod and said tubular member together forming a unit, and a handle on the free end of said tubular member, a shell-like member open in the upward direction and having a substantially semicylindrical inner surface adapted to support said tubular member within the area of said screw thread, said shell-like member having a nut thread element on its inner side, said nut thread element consisting of parts of a continuous nut thread extending in the axial direction along at least one of two substantially opposite inner sides of said shell-like member and within a small sector angle relative to the axis of said shell-like member, said threaded tubular member being adapted to be screwed along said nut thread elements and said draw rod thereby being adapted to be pivoted about its pivot point on said two-armed lever and to be moved into two end positions, said two end positions having a large distance and a small distance respectively from said shell-like member, said nut thread elements being designed so that, when said pivot point has its small distance from said shell-like member, all points on the flanks of each nut thread element facing towards said pivot point are disposed outside of those circles respectively which may be drawn about the pivot point in a manner so as to engage with each of said nut thread flanks only tangentially, while when said pivot points has its large distance from said shell-like member, all points on the other flanks of said nut thread elements are disposed at the inside of those circles respectively which may be drawn about said pivot point in a manner so as to engage with each of said other flanks only at one point, said screw thread on said tubular member and said nut thread elements when in engagement with each other forming a self-locking screw connection ,said unit adapted to be inserted into and disengaged from said shell-like member in a direction substantially transverse to the axis of said unit and said shell-like member, so that when said unit is disengaged from said shell-like member, said unit may be quickly moved substantially in its axial direction relative to and free of said shell-like member for coarsely adjusting the inclination of said back rest, while when said tubular member is in engagement with said shell-like member and said screw thread interengages with said thread elements, said tubular member may be turned about its axis and thereby screwed along said shell-like member for finely adjusting the inclination of said back rest and for locking said back rest in the adjusted position.

6. The seat, as set forth in claim 1, in which said threaded element forming said nut segment is pivotably connected to said seat frame so as to be pivotable about an axis intersecting the axis of said nut segment substantially at a right angle thereto and extending parallel to the pivot axis of said draw rod on said lever.

7. The seat, as set forth in claim 1, in which said threaded element forming said nut segment is rotatable in a manner so that its axis intersects the pivot axis of said draw rod on said lever.

8. The seat, as set forth in claim 1, further comprises a guide bar rigidly connected to said nut segment and having a longitudinal slot extending parallel to the axis of said nut segment, and a pivot member pivotably connecting said lever and said draw bar and extending transversely through and slidable along said slot.

References Cited by the Examiner

UNITED STATES PATENTS

| 1,375,781 | 4/1921 | DeLong | 85—33 |
| 2,062,132 | 11/1936 | Jordan | 74—424.8 |
| 2,556,572 | 6/1951 | Brinkhurst | 74—424.8 |
| 2,579,305 | 12/1951 | Cushman | 297—361 |
| 2,931,264 | 4/1960 | Dallman | 85—33 |
| 3,063,302 | 11/1962 | Hover | 74—424.8 |

FOREIGN PATENTS 483,390  7/1953  Italy.

FRANK B. SHERRY, *Primary Examiner.*

R. B. FARLEY, *Assistant Examiner.*